(12) United States Patent
Kreschel et al.

(10) Patent No.: US 9,144,854 B2
(45) Date of Patent: Sep. 29, 2015

(54) METHOD OF GENERATING GEAR TEETH, AND A GEAR-CUTTING MACHINE THAT IS OPERABLE ACCORDING TO SAID METHOD

(71) Applicant: GLEASON-PFAUTER MASCHINENFABRIK GMBH, Ludwigsburg (DE)

(72) Inventors: Juergen Kreschel, Hemmingen (DE); Claus Kobialka, Marbach a.N. (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 139 days.

(21) Appl. No.: 13/905,420

(22) Filed: May 30, 2013

(65) Prior Publication Data

US 2013/0336739 A1 Dec. 19, 2013

(30) Foreign Application Priority Data

Jun. 19, 2012 (DE) .......................... 10 2012 012 617

(51) Int. Cl.
*B23F 17/00* (2006.01)
*B23F 5/12* (2006.01)
*B23F 5/16* (2006.01)

(52) U.S. Cl.
CPC . *B23F 17/00* (2013.01); *B23F 5/12* (2013.01); *B23F 5/16* (2013.01); *B23F 5/163* (2013.01);
(Continued)

(58) Field of Classification Search
CPC .............. B23F 5/12; B23F 5/16; B23F 5/163; B23F 17/00; Y10T 409/10159; Y10T 409/101749; Y10T 409/102703; Y10T 409/102862; Y10T 409/103021; Y10T 409/10318; Y10T 409/103498; Y10T 409/103816; Y10T 409/10395; Y10T 409/104134; Y10T 409/105247; Y10T 409/107791; Y10T 409/10795
USPC ........... 409/11, 12, 18, 19, 20, 21, 23, 25, 26, 409/27, 34, 50, 51
See application file for complete search history.

(56) References Cited

U.S. PATENT DOCUMENTS 1,583,790 A * 5/1926 Green .............................. 409/47
2,102,659 A * 12/1937 Wildhaber ....................... 409/12

(Continued)

FOREIGN PATENT DOCUMENTS

WO 02/45895 A1 3/2002
WO 2006/133864 A1 12/2006

OTHER PUBLICATIONS

Lange, John, "Innovative CNC Gear Shaping", Gear Technology, Jan./Feb. 1994, pp. 16-29.

(Continued)

*Primary Examiner* — Daniel Howell
*Assistant Examiner* — Michael Vitale
(74) *Attorney, Agent, or Firm* — Robert L. McDowell

(57) ABSTRACT

The invention concerns a method of generating gear teeth, wherein a workpiece which is to receive a toothed profile and a cutting tool are advanced toward each other in a rolling feed motion until each tooth flank of the gear profile has been generated after several passes of the tool, wherein in each pass a cut surface containing at least one flank cut is generated on the workpiece, wherein an auxiliary motion is superimposed on the rolling motion, which has the effect that the flank cuts generated in at least two immediately consecutive passes will be connected to each other. In addition, the invention also concerns a gear-cutting machine with the requisite control features to perform the method.

10 Claims, 8 Drawing Sheets

(52) U.S. Cl.
CPC *Y10T 409/100159* (2015.01); *Y10T 409/10795* (2015.01); *Y10T 409/101431* (2013.01); *Y10T 409/101749* (2015.01); *Y10T 409/105724* (2015.01)

(56) References Cited

U.S. PATENT DOCUMENTS

| | | | |
|---|---|---|---|
| 3,738,225 A | | 6/1973 | Tixier |
| 4,475,319 A | * | 10/1984 | Wirz .................................. 451/5 |
| 6,077,150 A | * | 6/2000 | Jankowski ....................... 451/47 |
| 2003/0049084 A1 | * | 3/2003 | Bradfield et al. ............... 409/12 |

OTHER PUBLICATIONS

International Search Report and Written Opinon for PCT/EP2013/001695 dated Oct. 4, 2013.

\* cited by examiner

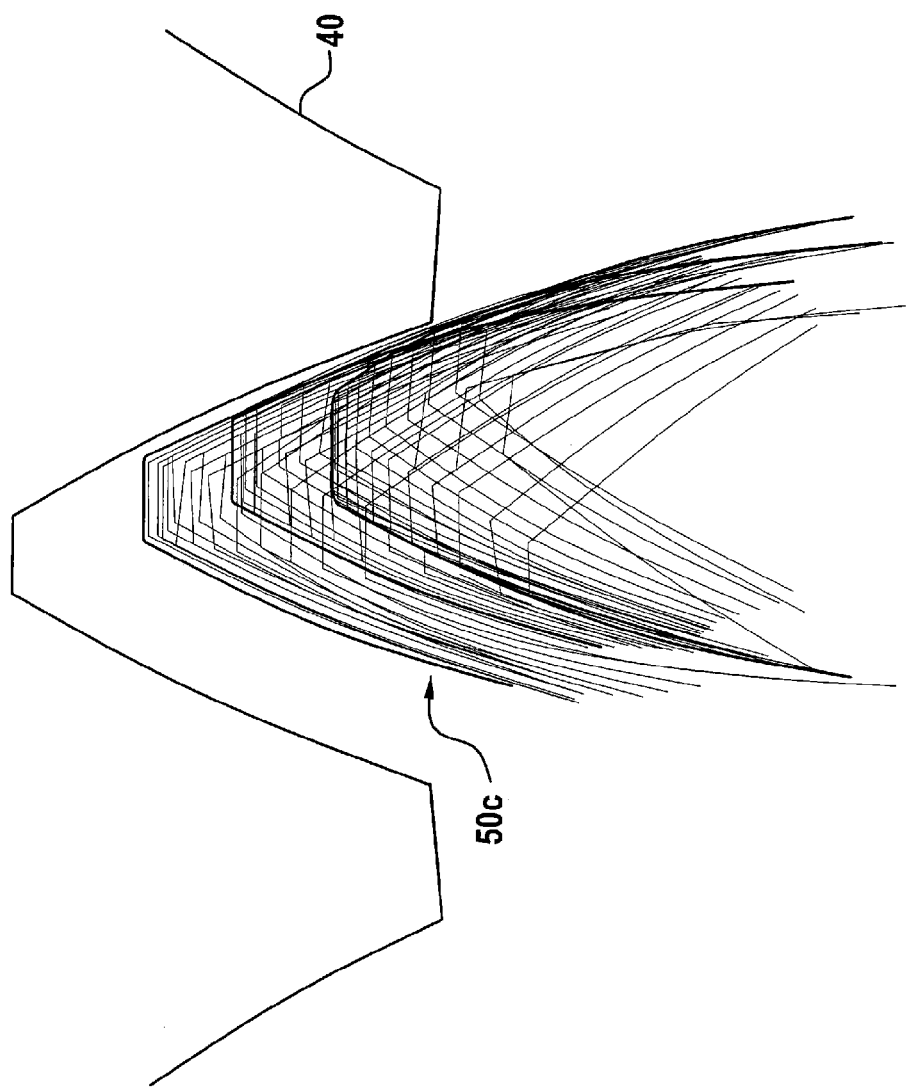

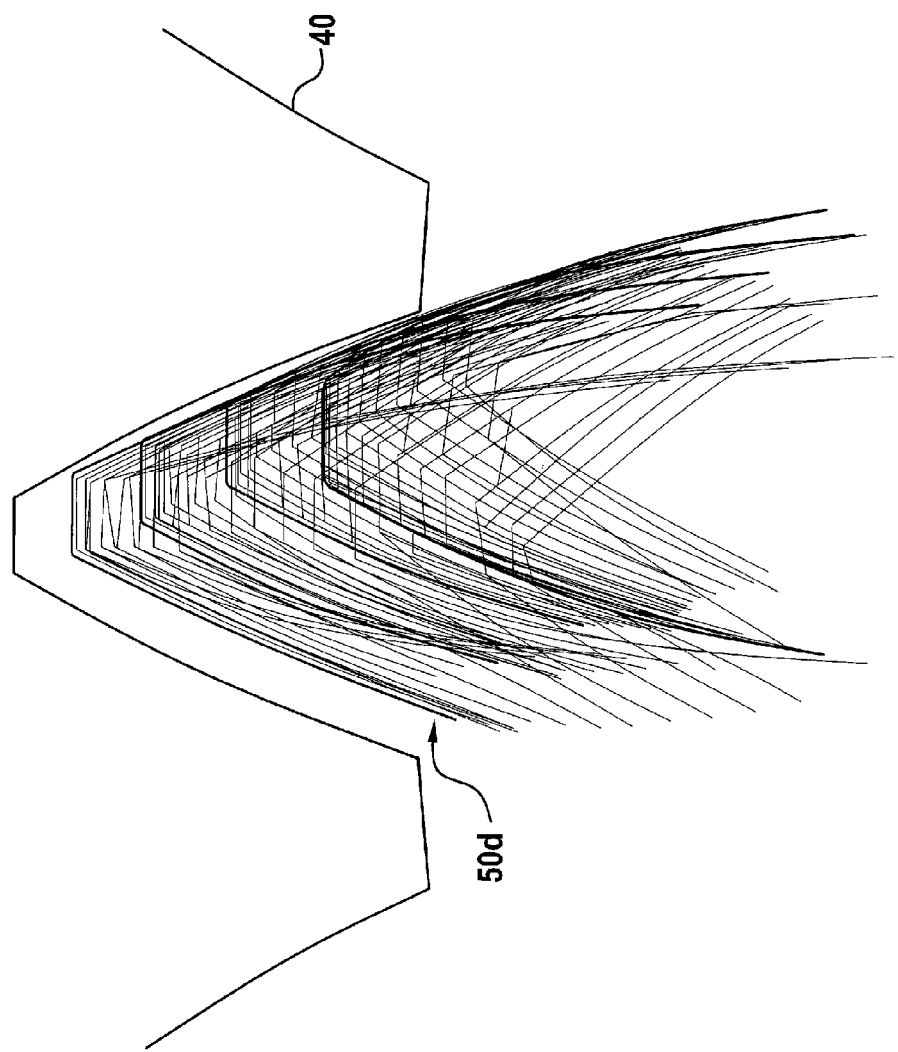

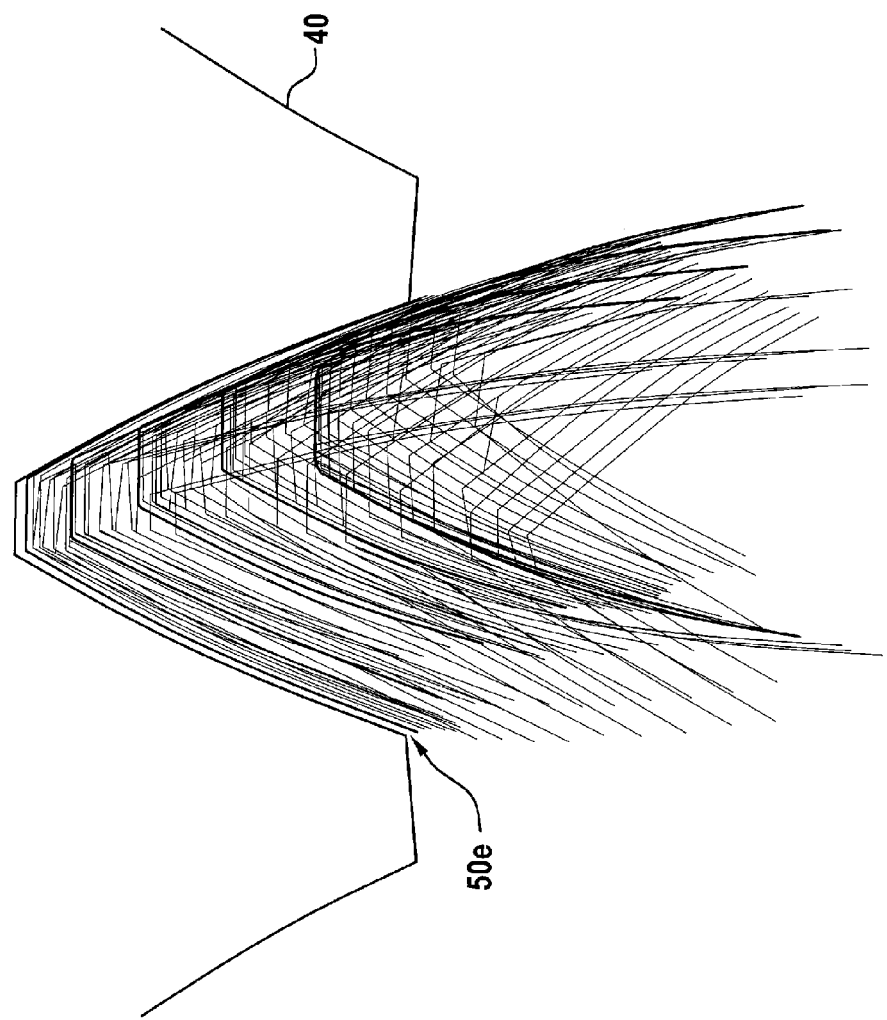

METHOD OF GENERATING GEAR TEETH, AND A GEAR-CUTTING MACHINE THAT IS OPERABLE ACCORDING TO SAID METHOD

The invention concerns a method of generating gear teeth, wherein a workpiece which is to receive a toothed profile and a cutting tool are advanced toward each other in a rolling feed motion until each tooth flank of the gear profile has been generated after several passes of the tool, wherein in each pass a cut surface containing at least one flank cut is generated on the workpiece. In addition, the invention also concerns a gear-cutting machine with the requisite control features to perform the method.

Machining methods of this kind belong to the known state of the art, including in particular the rolling/generating methods in which a gear-shaped tool is employed, such as gear-shaping or skiving. In these methods, the tooth flanks are generated in several passes that differ from each other in their respective feed depths, wherein the tooth flanks that are in the process of being generated need not conform to the flank geometry of the final gear profile, as an allowance is usually made in the machining for a later finishing process. Normally, starting for example from a workpiece blank, material is removed in a first pass with a first feed depth so that a first cut surface is generated whose shape is symmetric to the center of the tooth gap of the eventual gear profile and which gives an indication of how much material was removed in the first pass.

Figure 3:
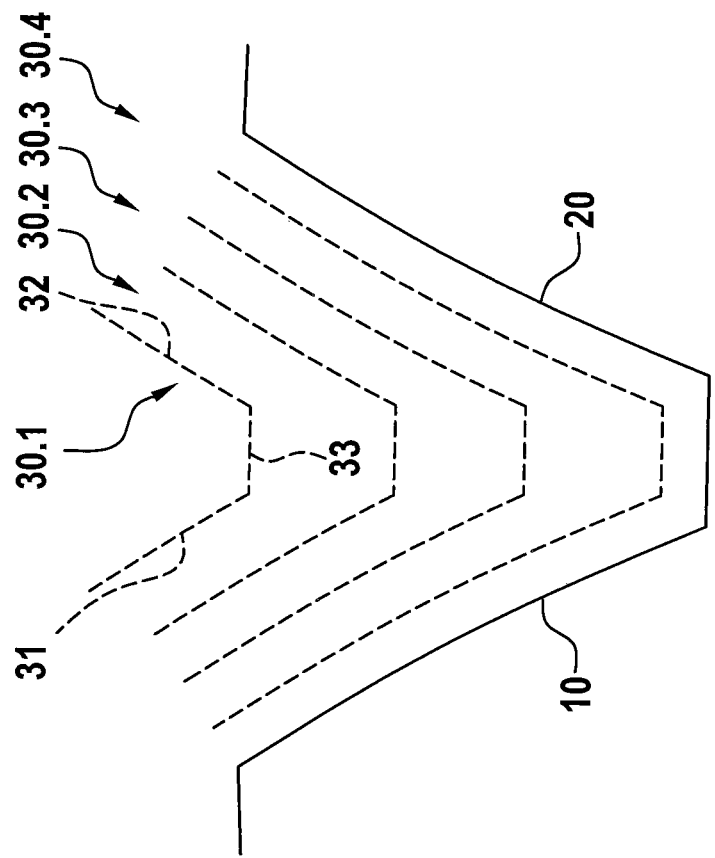

This is illustrated schematically in FIG. 3 in a sectional view where the drawing plane is orthogonal to the axis of the workpiece. The reference symbol 10 in this drawing indicates the tooth flank to be produced after the last pass on what is the trailing side of the tooth in this process, while the reference symbol 20 indicates the tooth flank on the leading side of the tooth. Not shown in this drawing is the shape of the tooth gap of the finished workpiece after the later finishing process, which still requires the removal of an allowance q from the tooth flanks 10, 20.

This drawing illustrates further that the cut surface 30.1 of the first pass has a (trailing) flank cut 31, a bottom cut 33, and a (leading) flank cut 32. The distance between the bottom cut 33 and the previous surface of the workpiece blank (not shown in the drawing) represents a measure for the feed depth in the first pass.

In the second pass, the feed depth is increased, so that as a result of removing more material through the cutting action of the rolling motion the cut surface 30.2 is formed which has likewise two flank cuts and a bottom cut.

The number of passes is usually controlled in such a way that each pass removes the desired amount of material. In the schematically illustrated example of the prior art, the machining takes five passes of which the first four produce the cut surfaces 30.1, 30.2, 30.3 and 30.4, while in the last pass the flanks 10, 20 are formed. The corresponding cut surface thus represents the envelope profiles of the resultant tooth flanks. In the interest of maximizing the service life of the tool, a further aim is to closely balance the wear between the leading and trailing flanks of the gear-cutting tool. This is demonstrated for example in a diagram in which the cumulative thickness of the shavings produced in the cutting of a tooth gap is plotted over the length of the cutting edge of a tooth of the tool. In such a diagram the two flank sides will be essentially mirror-symmetric relative to the head portion of the cutting edge of the tool.

Although state-of-the-art methods can come close to achieving symmetrical wear exposure on the leading and trailing flanks and thereby extending the service life of the tool, this invention has the objective to provide a further improved method of the generic kind described in the introductory paragraph.

From a process-engineering-oriented point of view, this task is solved through a further development of the aforementioned method, wherein the improvement is distinguished essentially by the fact that the rolling motion is supplemented by a superimposed auxiliary motion which has the effect that the flank cuts generated in at least two immediately consecutive passes will be connected to each other.

In the course of the invention, the conclusion was reached that the inventive method leads to a longer service life of the cutting tool. It reduces the number of three-flank shavings (i.e. shavings produced by the simultaneous removal of material from the two flanks and the bottom of the tooth gap generated in a given pass, also referred to as U-chips) which continue to be generated in spite of the symmetric cutting strategy explained above, taking tool wear into consideration based on a relevant chip separation zone near the cutting edge.

With the inventive concept of superimposing an auxiliary motion on the rolling motion, one achieves the result that two flank cuts generated in consecutive passes will hang together, whereby the amount of U-shaped chips produced in the process will be minimized. The tool is guided along the flank cut that was generated in the preceding pass and will therefore essentially no longer cut a chip off this guide surface when the tooth of the tool descends into the gap in the workpiece that is to be cleared out in the current pass. This means that the thickness of the chip cut off by the guided cutting edge is effectively approaching zero, in any case that the chip thickness in this area is less than a chip thickness limit which is defined by the cutting edge rounding radius.

It is in particular being envisioned to form such connections between the flank cuts of successive passes for several, in particular for all, of the successive passes, so that as a result the length of the guide path is extended and, with the growing number of passes, a continuously increasing portion of the cutting edge of the tool essentially no longer performs any cutting work. Nevertheless, the service life of the tool is lengthened due to the overall advantages of the more favorable cutting strategy. The tooth flanks generated in the foregoing process can subsequently be reworked in a finishing operation. For example, a first tooth flank can be generated in n=2 passes with the connected flank cuts, and in a subsequent phase of m≥1 passes the workpiece can be machined without the superimposed auxiliary motion.

In order to limit the influence that the required auxiliary motion has on the operational sequence of the generating process, it is preferred if two consecutive connections between cuts (i.e. between the cuts produced by at least three consecutive passes) are formed on the side of the same flank. Thus, the additional tangentially directed movements which are required in a given pass will not have opposite algebraic signs relative to a zero point of the auxiliary motion, only their magnitude will change.

With preference, the connected flank cuts are formed on the flanks that are on the trailing side in the machining process.

With a given rigidity of the cutting system, this has the effect that especially in the machining of spur gears one obtains a tangential force maintaining the same direction, which improves the quality of the result. In the machining of the leading flanks, the chip thickness is accordingly increased by a significant amount. The chip separation zone is shifted on the chip surface towards areas that are farther from the cutting edge.

It is particularly preferred if the connected flank cuts follow the profile of a tooth flank that is being generated (in contrast to cuts that remove material symmetrically from the center of the tooth gap in both directions towards the tooth flanks that are to be generated). Accordingly, the invention also sets forth as an independent disclosure a method of generating gear teeth, wherein a workpiece which is to receive a toothed profile and a cutting tool are advanced toward each other in a rolling feed motion until each tooth gap between the tooth flanks of the toothed profile has been generated after several passes of the tool, wherein the method is distinguished by the feature that an auxiliary motion is superimposed on the rolling motion, which has the effect that the generation of the tooth gap occurs from the side of one tooth flank towards the side of the other tooth flank.

In a further preferred implementation of the method, it is envisioned that the tooth flank being generated is in part determined by a flank cut of at least one of the passes preceding the last pass. The guide surface in the form of the flank cuts produced in the preceding passes is thus placed in essence on the tooth flank being generated. This has the effect that a plurality of the completed flank cuts, in particular the flank cuts of all of the passes, contribute to determining the tooth flank being generated. Due to the superimposed auxiliary motion, every pass of a tool now forms an envelope cut of a flank, wherein the auxiliary motion in the last machining step may be, and preferably is, reduced to zero.

In accordance with what has been said above, the flank referred to in the preceding paragraph is preferably the flank that lies on the trailing side during the machining process, also called the trailing flank.

The auxiliary motion itself is determined preferably by calculating an offset between the position that the workpiece would occupy based on the rolling motion and the position of the tooth flank. This can for example be accomplished by applying an offset as a correction parameter to the pure rolling motion, wherein the parameter value indicates the distance of the tooth flank being generated from the center of the tooth gap as a function of the feed depth of the respective pass. This offset is adjusted in each new pass. If the machining process involves a continuously changing infeed, the offset becomes a continuous function of the feed depth, for example if the infeed in a gear-shaping process occurs in the form of a spiral-shaped feed movement.

In regard to the nature of the superimposed auxiliary motion, several variants are possible. First of all, the preferred way to generate the auxiliary motion is to introduce a change in the relative phase angle between a rolling rotation of the workpiece about a workpiece rotation axis and a rolling rotation of the tool about a tool rotation axis. This auxiliary movement, which is referred to in a simplified way as "auxiliary rotation" likewise depends on the feed depth. If flank modifications are called for, this infeed-dependent auxiliary rotation could for example be supplemented by superimposing another offset in the coupling to the rolling motion, which varies in regard to other parameters and which is suitable to achieve the tooth flank modifications.

As an alternative and/or as an additional component in generating the auxiliary motion, a linear relative motion between the tool and the workpiece can be used which runs tangential to a rolling rotary motion of the workpiece about the workpiece-rotation axis. Depending on the way in which the feed movement is being modified, this linear relative motion takes the form of a tangential displacement in regard to the relative positions of tool and workpiece wherein the amount of the displacement is selected for each pass, while in the case of a continuous feed movement the linear relative motion takes the form of a continuous linear movement that depends on the feed depth.

In regard to the selected feed depths for each pass, one could in principle select a feed movement in equidistant steps. However, it is preferred to control the mutual feed movements between the tool and the workpiece dependent on the volume/time rate at which chips are generated. For example if a maximum volume rate of chip removal is prescribed, the maximum feed depth for the next pass follows from the intended process strategy, and the next offset, in turn, follows from the next feed depth which can be selected equal to or smaller than the maximum feed depth.

Preferred applications of the method are in the areas of gear-shaping and skiving.

The scope of protection that is sought for this invention also extends to a computer program for the control of a gear-cutting machine, wherein the program, when executed in a controller device of the gear-cutting machine, controls the latter in carrying out a method according to one of the aspects of the method that have been discussed hereinabove.

In regard to technical aspects of machine design the scope of protection further extends to a gear-cutting machine, in particular a gear-shaping machine or a skiving machine whose controller device is designed and operable to control the machine in the execution of a method according to the aspects discussed hereinabove. The terms "gear-shaping machine" and "skiving machine" as used here are not limited to machines equipped exclusively for gear-shaping and skiving, but also include machines which can, among other capabilities, perform gear-shaping and skiving processes.

Figure 1A:
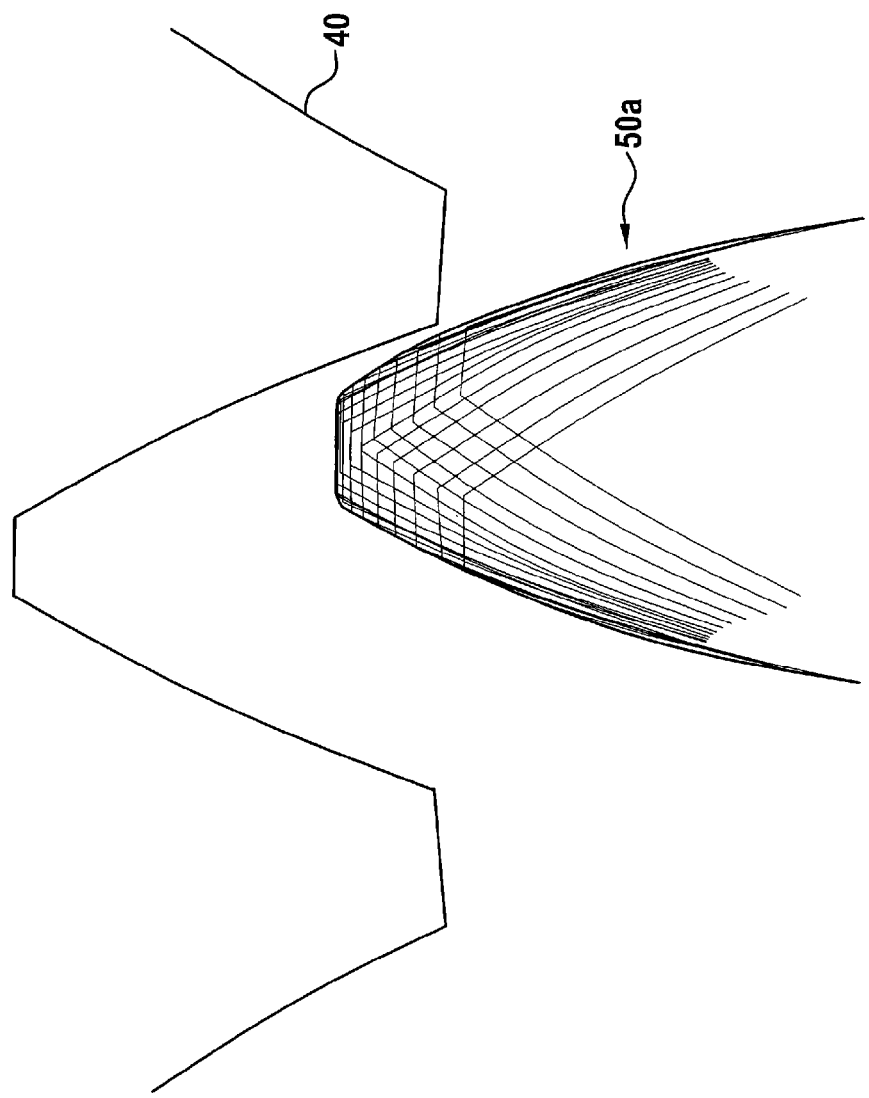
Figure 1B:
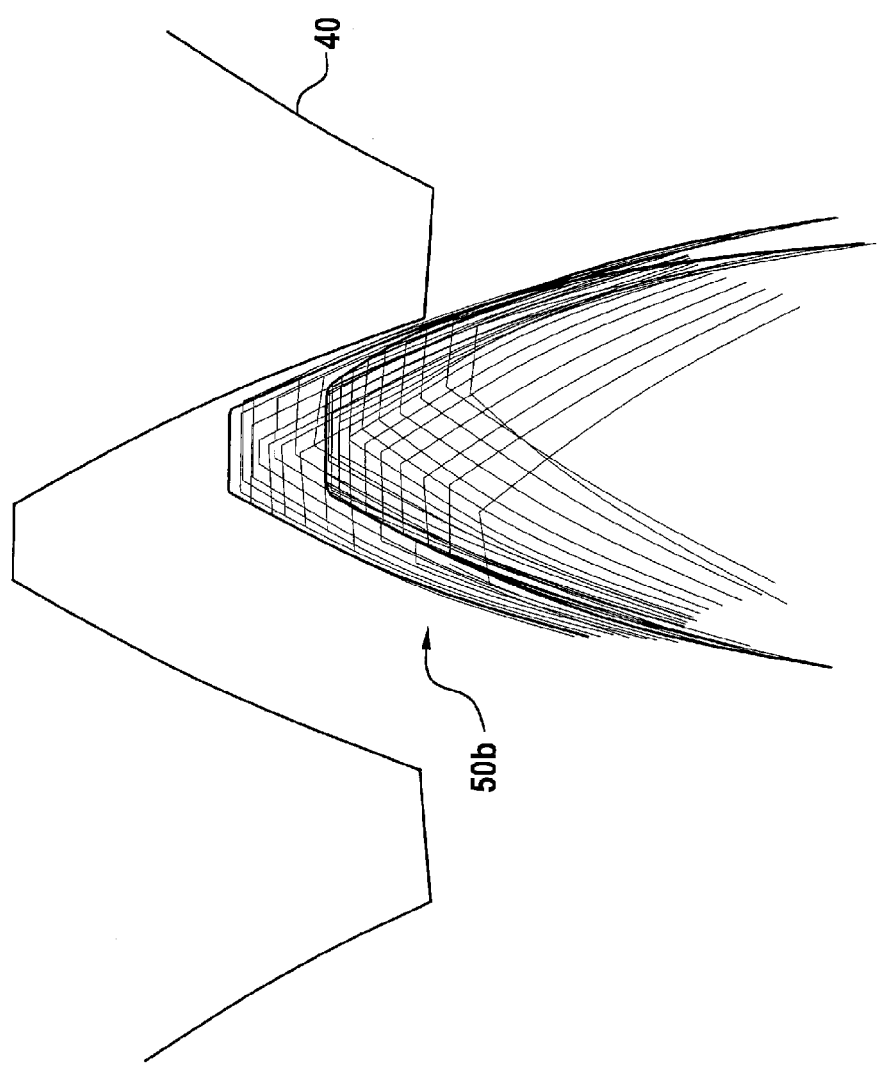
Figure 1F:
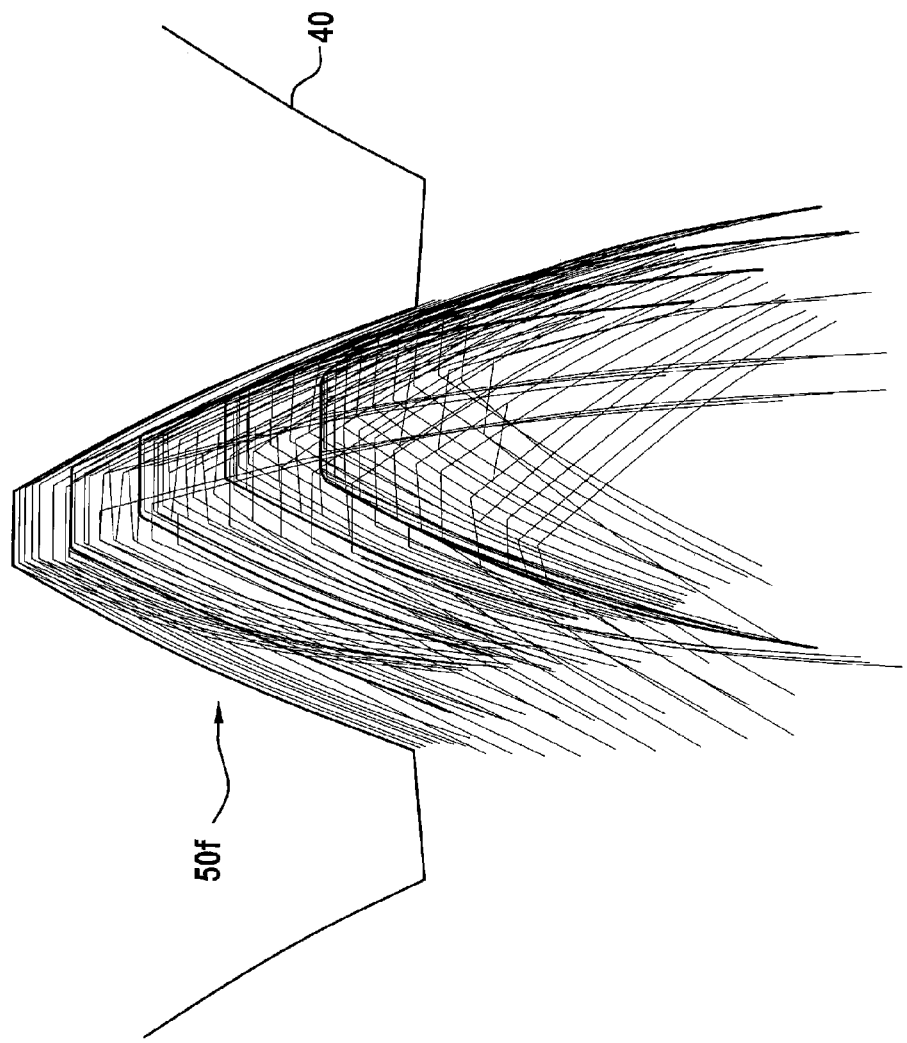
Figure 2:
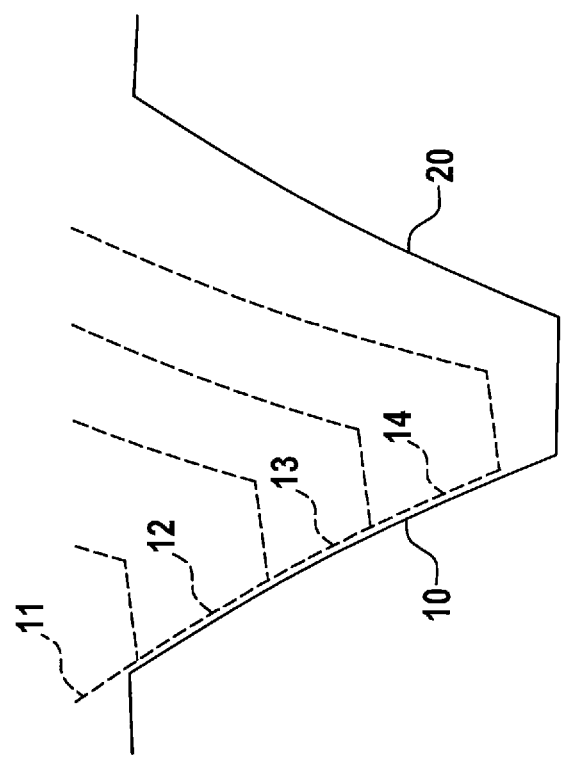

Further distinguishing traits, details and advantages of the invention will be explained in the following description of the attached drawings, wherein FIGS. 1*a* to 1*f* schematically illustrate a time sequence of the discrete machining positions used in the method according to the invention, FIG. 2 schematically illustrates the cut surfaces and tooth gaps resulting from each pass, specifically in comparison to FIG. 3, and FIG. 3, in a form analogous to FIG. 2, represents the cut surfaces and tooth gaps generated by a process of the prior art.

FIGS. 1*a* to 1*f* schematically represent the tool 40 and the sequence of discrete roll positions 50*a* to 50*f* of a tooth of a gear that is to be generated, as they can typically occur in a gear-shaping process performed with the method according to the invention. Each of the FIGS. 1*b* to 1*f* also shows the discrete roll positions of all of the preceding passes. Based on the change in the roll positions of one pass compared to the positions of the preceding path, it is apparent that the passes differ from each other as a result of an offset that is caused by an auxiliary motion which is superimposed on the pure rolling motion. The respective symmetry axes (not shown in the drawings) of the curve bundles 50*a* to 50*f* belonging to the discrete roll positions are tangentially spaced apart from each other. This offset is selected so that the flank cuts generated by the increasingly deeper tool engagement in successive passes are hanging together on the trailing tooth flank.

The chip-removing work of the cutting tool is therefore performed in essence only by the cutting edge that generates the leading tooth flank, the cutting edge at the tooth head of the cutting tool, and a next-to-the-head portion of the cutting edge generating the trailing tooth flank. In other words, in a diagram in which the cumulative thickness of the shavings produced in the cutting of a tooth gap is plotted over the length of the cutting edge of a tooth of the tool there will be a pronounced asymmetry at least between the areas that are distant from the tooth-head section of the cutting edge. This asymmetry can amount to a hundred percent or more, in particular as much as several hundred percent.

The last machining pass in this example is performed as a finishing pass wherein the superimposed auxiliary motion is modified in relation to the preceding machining pass and can be reduced to zero in relation to the pure rolling motion.

As can be verified in an experiment by inspecting the chips that come out of a machining process according to this method, only a small number of U-shaped chips remains being generated. In the statistical distribution of the chips being generated, the maximum is represented by the L-shaped chips. The overall result is a reduced amount of wear on the tool and thus an increase in the time periods over which tools can stay in service.

FIG. 2 illustrates again in a schematic view the successive stages of forming the tooth gaps in a sequence of passes (five passes in the example of FIG. 2) in order to visualize the difference in the progression of cut surfaces, specifically the flank cuts 11, 12, 13, 14 in comparison to the respective flank cuts 31 of the cut surfaces 30.1, 30.2, . . . of FIG. 3. While in the case of FIG. 3 the cut surface of a later pass embraces the cut surface of the preceding pass in essence symmetrically and at a distance, in FIG. 1 this separation of the cutting traces is absent along one flank, as the flank cuts of two successive passes are hanging together. As is further evident from FIG. 2, on the side where the flank cuts 11, 12, 13, 14, . . . are hanging together they follow the profile of the tooth flank 10 that is to be generated, so that the tooth gap that is being machined is not cleared out symmetrically from the center towards the flanks, but from one flank towards the other flank. The cutting away of material over the full length of the cutting edge takes place only at the leading flank, with a markedly increased chip thickness in comparison to FIG. 3. This characterizes the different machining concept according to the teachings disclosed in this invention. In the last pass, the machine settings for the axis movements to generate the tooth flanks are identical for the two methods illustrated in FIG. 2 and FIG. 3; however, due to the different cut surfaces of the preceding pass, there will be a difference in the shape and dimensions of the chips cut in the last pass of FIG. 2 compared to the last pass of FIG. 3.

Moreover, it should be noted that the invention is not limited to the gear-shaping process illustrated as an example in FIGS. 1a to 1f. In fact, it can also be used for other chip-removing machining processes, in particular for skiving, wherein the individual features disclosed in the foregoing description as well as in the following claims can be relevant individually as well as collectively in any combination for realizing the invention in its different embodiments.

The invention claimed is:

1. A method of generating gear teeth having tooth flanks (10, 20), wherein a workpiece which is to receive a toothed profile and a cutting tool are advanced toward each other in a rolling feed motion until each tooth flank (10, 20) having the toothed profile has been generated after several passes of the tool, wherein in each pass a cut surface containing at least one flank cut (11, 12, 13, 14) is generated on the workpiece, characterized in that an auxiliary motion is superimposed on the rolling feed motion whereby flank cuts generated in at least two immediately consecutive passes (11-12, 12-13, 13-14) are connected to each other, said method further comprising a last pass of the tool wherein a cut surface is generated by the rolling feed motion without said auxiliary motion.

2. Method according to claim 1, wherein at least two connections between flank cuts which are produced by at least three immediately consecutive passes are formed on a side of one of the tooth flanks (10, 20).

3. Method according to claim 1, wherein during said generating, one of said tooth flank (10, 20) is a leading flank and the other of said tooth flanks (10, 20) is a trailing flank, and wherein the connected flank cuts are formed on the tooth flanks that are on the trailing flank in the generating process.

4. Method according to claim 1 wherein the connected flank cuts follow the toothed profile of a gear tooth flank that is being generated.

5. Method according to claim 1 wherein the auxiliary motion is determined from a calculation of an offset between a position that the workpiece would occupy based on the rolling feed motion and a position of the tooth flank.

6. Method according to claim 1 wherein the auxiliary motion is effected by introducing a change in a relative phase angle between a rolling rotation of the workpiece about a workpiece-rotation axis and a rolling rotation of the tool about a tool-rotation axis.

7. Method according to claim 1 wherein the auxiliary motion is effected by introducing a linear relative motion between the tool and the workpiece which runs tangential to a rolling rotation of the workpiece about a workpiece-rotation axis.

8. Method according to claim 1 wherein feed movements between the tool and the workpiece are controlled dependent on a volume/time rate at which chips are generated during said rolling feed motion.

9. Method according to claim 1 wherein the method is a gear-shaping method.

10. Method according to claim 1 wherein the method is a skiving method.

* * * * *